March 19, 1968　　　L. A. ROSENTHAL　　　3,374,429
BRIDGE CIRCUIT FOR DETERMINING THE THERMAL PARAMETERS
OF BRIDGEWIRES USED IN ELECTRO-EXPLOSIVE DEVICES
Filed May 15, 1964
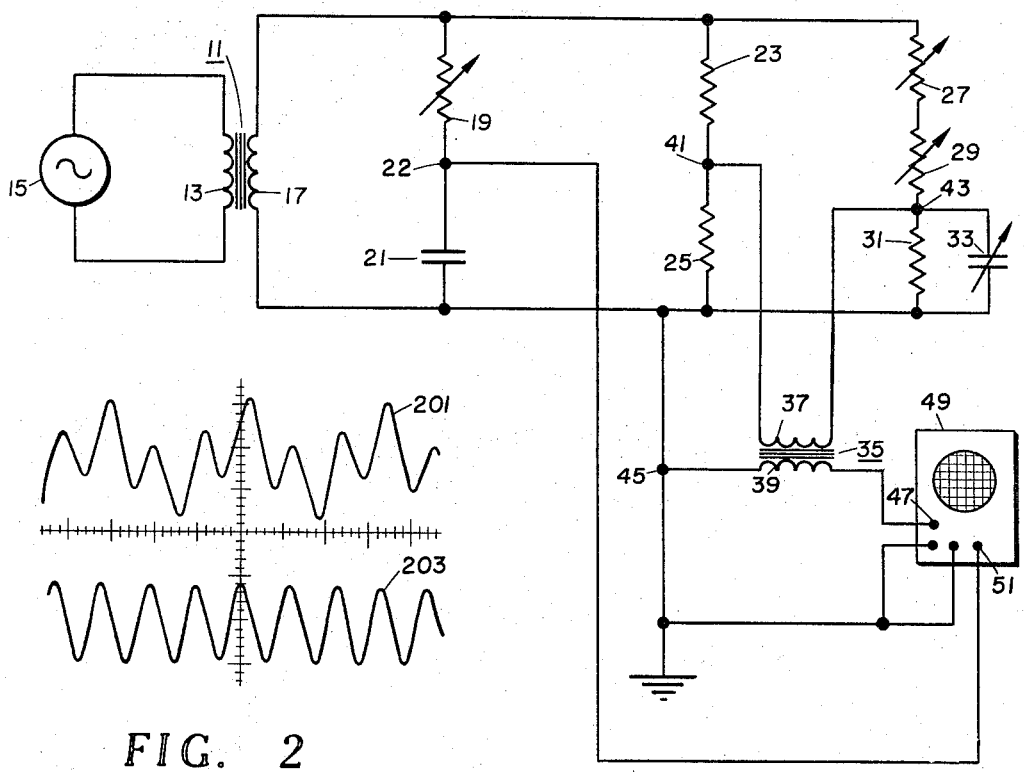
FIG. 2
FIG. 1
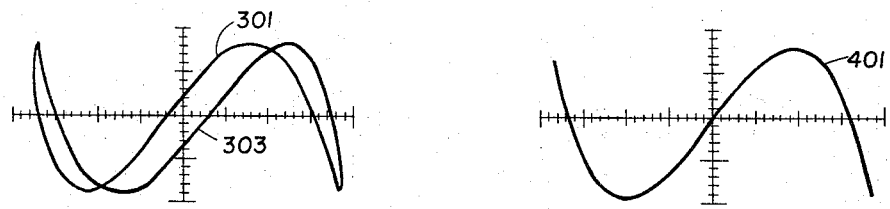
FIG. 3
FIG. 4
*INVENTOR*
Louis A. Rosenthal
BY *Thomas O. Watson Jr.*
*ATTORNEY*

United States Patent Office 3,374,429
Patented Mar. 19, 1968

3,374,429
BRIDGE CIRCUIT FOR DETERMINING THE THERMAL PARAMETERS OF BRIDGEWIRES USED IN ELECTRO-EXPLOSIVE DEVICES
Louis A. Rosenthal, Highland Park, N.J., assignor to the United States of America as represented by the Secretary of the Navy
Filed May 15, 1964, Ser. No. 367,903
6 Claims. (Cl. 324—57)

ABSTRACT OF THE DISCLOSURE

An A.C. bridge circuit for determining the thermal parameters of bridgewires used in electro-explosive devices. When an A.C. supply voltage is applied to the bridge network in which a bridgewire of an electro-explosive device is connected as a leg thereof, an A.C. voltage having three times the supply voltage will appear across the bridgewire which has an amplitude and phase relationship which are indicative of the thermal parameters of the bridgewire.

The invention described herein may be manufactured and used by or for the Government of the United States of America for governmental purposes without the payment of any royalties thereon or therefor.

This invention relates to an electrical bridge circuit for measuring characteristics of a bridgewire electro-explosive device and more particularly to an A-C bridge circuit for determining the thermal time constant and the heat loss factor by measuring the amplitude and phase of a third harmonic voltage generated in the bridgewire due to thermal follow.

The measurement of electrothermal parameters of a bridgewire and the dependence of these parameters upon the surrounding explosive mixtures in electro-explosive devices can be of value in the study of such devices. The response to various electrical input wave forms applied to the bridgewire depends on the thermal time constant ($\tau$), the heat capacity ($C_p$), and the heat loss factor ($\gamma$). A simple and convenient thermal model based on a lumped single time constant system is provided by the following basic differential equation:

$$C_p \frac{d\theta}{dt} + \gamma\theta = P(t)$$

where $P(t)$ is the power time function and $\theta$ is the temperature elevation of the bridgewire. The thermal time constant $\tau$ is defined according to $\tau = C_p/\gamma$.

As another approach to measurement of thermal response in bridgewires, dynamic measurements can be made for a sinusoidal power source. If a sinusoidal current is passed through a thermally sensitive bridgewire element, the power dissipated has an average value and a component at a frequency of $2\omega$ where $\omega$ is the current frequency. The cyclic power variation gives rise to a resistance variation which lags the power cycle by some angle. This angle of lag is related to the thermal time constant of the unit. In addition, a resistance variation at $2\omega$ when multiplied by the current at $\omega$ yields a third harmonic voltage at $3\omega$. The magnitude of this third harmonic voltage and the phase angle thereof are indications of the thermal parameters of the bridgewire being tested.

It is an object of this invention to provide a bridge circuit for testing bridgewires of electro-explosive devices.

It is another object of this invention to provide an A-C bridge circuit for determining thermal parameters of an electro-explosive bridgewire.

It is a further object of this invention to provide an A-C bridge circuit for testing bridgewires of electro-explosive devices in which thermal parameters may be determined by measuring the magnitude and phase of a third harmonic voltage developed in the bridge circuit.

Other objects and many of the attendant advantages of this invention will be readily appreciated as the same becomes better understood by reference to the following detailed description when considered with the accompanying drawing wherein:

FIG. 1 of the drawing illustrates schematically, an embodiment of this invention in which the thermal parameters of a bridgewire may be tested;

FIG. 2 of the drawing illustrates an oscillograph representation of third harmonics in a bridgewire testing circuit;

FIG. 3 of the drawing illustrates an oscillograph representation of a third harmonic voltage of a bridgewire testing circuit with phase shift; and FIG. 4 of the drawing illustrates an oscillograph representation of a third harmonic voltage trace of a bridgewire testing circuit at balance.

For some theoretical aspects of the measurement of thermal follow consider the following equation for current flow in an electro-thermal bridgewire element:

$$i = I \sin \omega t$$

where $i$ is the instantaneous current, $I$ is the maximum current, $\omega$ is the frequency of the power source and $t$ is time in seconds.

The instantaneous power dissipation will be:

$$i^2 R = \frac{I^2}{2} R (1 - \cos 2\omega t)$$

where R is the hot resistance. The A-C or cyclic power variation will be:

$$P_{ac} = \frac{I^2}{2} R \cos \omega t$$

and the average power will be:

$$P_{AV} = \frac{I^2 R}{2}$$

Because of the A-C power variation there is a temperature fluctuation $P_{ac}/\gamma$ and a resistance fluctuation $$R_{ac} = \frac{R \alpha P_{ac}}{\gamma}$$

where $\alpha$ is the temperature coefficient of resistance determined at the hot temperature, $R_{ac}$ is a variation of resistance superimposed on the average, hot resistance R, of the bridgewire. The resistance variation can then be described in time dependent form $$R_{ac} \frac{I_2 R^2}{2\gamma} \alpha \cos 2\omega t$$

providing the follow is complete. Actually the $R_{ac}$ variation lags at some angle $\beta$ and is in phase with $\theta(t)$, the temperature rise time function. From the basic differential equation the lag angle $\beta = \tan^{-1} 2\omega\tau$. The product of the instantaneous current term and the resistance variation term yields the dynamic voltage drop across the element according to $$\frac{I^3 R^2}{2\gamma} \alpha \cos 2\omega t$$

If the trigonometric term is expanded as $$\cos 2\omega t \sin \omega t = \frac{\sin \omega t}{4} + \frac{\sin 3\omega t}{2}$$

then a third harmonic amplitude is found as:

$$V_3 = \frac{I^3 R^2 \alpha}{4\gamma}$$

where $V_3$ is the maximum third harmonic voltage. Inserting the RMS values results in:

$$V_3 \text{ RMS} = \frac{I^3 \text{ RMS } R^2 \alpha}{2\gamma}$$

This voltage is lagging at the same angle as the resistance follow ($\beta$) and falls off with frequency in accordance with $$1/\sqrt{1+\tan^2 \beta}$$

The instantaneous value of the third harmonic voltage is:

$$v_3(t) = \frac{I^3 \text{ RMS } R^2 \alpha}{\sqrt{2} \; \gamma\sqrt{1+\tan^2 \beta}} \sin(3\omega - \beta)$$

where $v_3(t)$ signifies the instantaneous third harmonic voltage. This equation describes the fall off in amplitude and the phase lag observed in the harmonic generated as a function of frequency since $\tan \beta = 2C_p/\gamma = 2\omega\tau$.

The above equations may be found in NOLTR 62–205 report of the U.S. Naval Ordnance Laboratory.

Referring now to FIG. 1 of the drawing in which an A-C bridge circuit is illustrated, a transformer 11 has a primary winding 13 which is connected to an A-C voltage source 15, and a secondary winding 17 which is connected to the bridge circuit. The A-C voltage source 15 may be a 110-volt, 60-cycle source. The voltage across secondary winding 17 may be 25 volts. A variable resistor 19 and a capacitor 21 are connected in series across secondary winding 17.

A resistor 23 and the bridgewire 25 of an electro-explosive device to be tested are serially connected to winding 17. A variable resistance means 27, a variable resistance means 29 and a resistor 31 are also connected to winding 17. A variable capacitor 33 is connected in parallel with resistor 31. A third harmonic error voltage circuit includes an isolation transformer 35 having primary winding 37 and secondary winding 39. Primary winding 37 is connected to a junction 41 between resistors 17 and 25, and to a junction 43 between variable resistance means 29 and resistor 31. Secondary winding 39 is connected to a grounded juncture 45 and to a vertical display terminal 47 of an oscilloscope 49. The output juncture 22 of the phase shift circuit is connected to a horizontal display terminal 51 of oscilloscope 49.

In FIG. 1, the A-C voltage source 15 may be a 110-volt, 60-cycle source and transformer 11 may apply 25 volts to the secondary winding 17. The 25 volts across the secondary winding 17 are applied through a 500-ohm power resistor 23 to the bridgewire of the electro-explosive device 25, making it possible to pass 50 ma. through bridgewire 25. If a variable transformer is applied to the input, this current can be reduced to any desired safe level. The current is easily measured by replacing bridgewire 25 with a 1-ohm precision resistor and measuring the voltage drop across it. The adjacent comparison arm includes resistor 31 which may have a value of 20 ohms, an adjustable resistance means 29 which may be varied from 1K ohm to 4K ohms and a variable resistance means 27 which may be varied from 0 to 1K ohm. Variable resistance means 27 is used to achieve a fine degree of balance. At balance, resistance $R = 10{,}000/R_x$, where R is the resistance value of bridgewire 25 and $R_x$ is the value of resistance means 29. The range of the bridge is 2 to 10 ohms. By reducing resistor 31 to 10 ohms by means of a parallel resistor, the range is cut in half. Capacitor 33 balances out the reactive components of the bridge imbalance.

The phase shift network including capacitor and resistor is designed for 60 cycles, to provide a maximum phase shift of 37°. There is a small variation in amplitude with phase shift which merely changes the horizontal amplitude of the phase display. Although the phase shift can be calculated for various values of resistance means 19 it is more convenient to calibrate tis network using a commercial phase angle meter on a counter used for time interval measurements.

The high quality isolation input transformer is well shielded and offers no phase shift at operating frequencies, which for a 60-cycle input corresponds to 180 cycles. Care must be taken to provide good grounds and negligible pick-up with a typical drop of 100 mv. across the bridgewire, a 1 mv. error signal, after the transformer, corresponds to a resistance change of 0.05 percent. For adequate resolution, an oscilloscope of 1 mv./cm. sensitivity should be employed.

The third harmonic can be measured and displayed on an oscilloscope. In addition to the third harmonic voltage applied to the vertical deflection terminals, a signal which is in phase with the current is passed through an RC phase shift network to provide a reference phase voltage which may be applied to the vertical deflection terminals of the oscilloscope. If the fundamental is shifted by ⅓ the amount that the third harmonic is shifted due to thermal follow or lag, then both waveforms will be in phase for the oscilloscope display. The result is a unique single valued cubic waveform trace.

For example, if $$v = A \sin 3\omega t$$

and $$h = B \sin \omega t$$

with $v$ and $h$ corresponding to the voltages applied to the vertical and horizontal terminals respectively with A and B representing respective amplitudes of the two signals, and starting with the identity $$\sin 3\omega t = 3 \sin \omega t - 4 \sin^3 \omega t$$

and substituting the vertical and horizontal deflections indicated, $$\frac{v}{A} = \frac{3h}{B} - \frac{4h^3}{B^3}$$

$$v = \frac{3Ah}{B} - \frac{4Ah^3}{B^3}$$

which is the cubic equation of the oscilloscope display.

Referring now to FIGS. 2, 3 and 4 of the drawing, curve 201 illustrates an error wave form containing a fundamental frequency which may be canceled out by adjusting resistance means 29 and capacitor means 33 to yield an essentially pure third harmonic as shown in curve 203.

Curves 301 and 303 illustrate a typical Lissajous figure of a phase display which contains a fundamental component resulting in an opened type Lissajous figure. A phase shift will produce the same general type of display.

Curve 401 illustrates the single cubic trace which curves when the circuit is in balance.

Obviously many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A bridge circuit for determining thermal parameters of a bridgewire for an electro-explosive device by measuring the magnitude and phase of a third harmonic voltage comprising, a first transformer means having a core, a first primary winding and a first secondary winding, an A-C voltage source, means connecting said first primary winding to said A-C voltage source, a first terminal means, a second terminal means, a first series circuit comprising a first resistance means and a first capacitor with a first juncture therebetween, means connecting said first series circuit to said first and second terminal means, a second series circuit comprising a first resistor and an electro-explosive bridgewire resistor with a second juncture therebetween, means connecting said second series circuit to said first and second terminal means, a third series circuit comprising a second resistance means, a third resistance means, a second resistor with a third juncture between said third resistance means and said second resistor, and a capacitance means connected in parallel with said third resistor means, means connecting said second terminal to ground, means connecting said first juncture to a horizontal display circuit of an oscilloscope, a second transformer having a primary winding, a core and a secondary winding, means connecting the primary winding of said second transformer to said second and third junctures, means connecting one end of the secondary winding of said second transformer to ground, means connecting the other end of the secondary winding of said second transformer to the vertical display circuit of the oscilloscope whereby the phase and magnitude of third harmonic voltages developed may be observed.

2. An electrical bridge circuit for testing electro-explosive bridgewires comprising, an A-C voltage source, an electrical bridge circuit having a first resistance element, a second resistance element, a third resistance element and a fourth resistance element, said resistance elements being serially interconnected with a first juncture between said first and second resistance elements, a second juncture between said second and third resistor elements, a third juncture between said third and fourth resistance elements, and a fourth juncture between said fourth and first resistance elements, said first resistance element being an electro-explosive bridgewire, means for balancing the resistance of said bridge, means for balancing the reactance of said bridge, a variable phase shift circuit connected across said A-C voltage source, means connecting said A-C voltage source to said second and fourth junctures, an oscilloscope having a vertical display circuit and a horizontal display circuit, means applying the output voltage appearing between said first and third junctures to the vertical display circuit of said oscilloscope, means connecting said phase shift circuit to the horizontal display circuit of said oscilloscope whereby the magnitude and phase of a third harmonic output voltage from said bridge circuit may be observed and measured.

3. An electrical bridge circuit as in claim 2 in which said means for balancing the resistance of said bridge is a variable resistance in the third leg of said bridge circuit and said means for balancing the reactance of said bridge is a variable capacitor connected across said fourth leg of said bridge.

4. An electrical bridge circuit as in claim 3 in which said variable phase shift circuit is a series circuit comprising a variable capacitor and a resistor with a juncture therebetween, said juncture being connected to the horizontal display circuit of said oscilloscope.

5. An electrical bridge circuit as in claim 2 in which said variable phase shift circuit is a series circuit comprising a variable capacitor and a resistor with a juncture therebetween, said juncture being connected to the horizontal display circuit of said oscilloscope.

6. An electrical circuit for testing electro-explosive bridgewires comprising, an A-C voltage source, a bridge circuit, a first leg of said bridge circuit comprising an electro-explosive bridgewire to be tested, a second leg of said bridge circuit comprising a fixed resistor, a third leg of said bridge circuit comprising variable resistance means, a fourth leg of said bridge circuit comprising a fixed resistance means and a parallel connected variable capacitance means, said bridge circuit having input terminals and output terminals, means connecting the input terminals of said bridge circuit to said A-C voltage source, means connecting the output terminals of said bridge circuit to a vertical display circuit of an oscilloscope, a phase shifting circuit connected to said A-C voltage source, means connecting said phase shifting circuit to a horizontal display circuit of the oscilloscope.

References Cited

UNITED STATES PATENTS

| | | | |
|---|---|---|---|
| 2,328,985 | 9/1943 | Luck | 324—88 |
| 2,374,817 | 5/1945 | Hardy | 324—88 |
| 2,440,200 | 4/1948 | Jofeh | 324—57 X |
| 2,570,139 | 10/1951 | Maxwell | 324—57 |
| 2,677,803 | 5/1954 | Rork | 324—57 |
| 2,986,696 | 5/1961 | Seay | 324—88 X |

RUDOLPH V. ROLINEC, *Primary Examiner.*

E. E. KUBASIEWICZ, *Assistant Examiner.*